United States Patent [19]
Bakx

[11] Patent Number: 5,105,413
[45] Date of Patent: Apr. 14, 1992

[54] READ-AFTER-WRITE OPTICAL RECORDING DEVICE HAVING A SINGLE RADIATION SOURCE AND EMPLOYING WRITE MODULATION OF SUCH SOURCE

[75] Inventor: Johannes Bakx, Eindhoven, Netherlands

[73] Assignee: U.S. Philips Corporation, New York, N.Y.

[21] Appl. No.: 453,547

[22] Filed: Dec. 20, 1989

[30] Foreign Application Priority Data

Jun. 23, 1988 [NL] Netherlands ............... 8901588

[51] Int. Cl.$^5$ ............................................. G11B 7/125
[52] U.S. Cl. ........................................ 369/54; 369/116; 369/111
[58] Field of Search ............... 369/116, 54, 111, 121, 369/122, 106, 124, 109, 48; 250/205, 201.5

[56] References Cited
U.S. PATENT DOCUMENTS 4,363,116 12/1982 Kleuter et al. ............... 369/44.38
4,488,277 12/1984 McFarlane et al. ............... 369/54
4,631,713 12/1986 Romeas et al. ............... 369/116
4,935,913 6/1990 Shinoda ............... 369/54
4,949,331 8/1990 Maeda et al. ............... 369/111

Primary Examiner—Roy N. Envall, Jr.
Assistant Examiner—Thang V. Tran
Attorney, Agent, or Firm—Leroy Eason

[57] ABSTRACT

In an optical recording device, a record carrier (4) is scanned with an intensity-modulated write beam (13) to form an information pattern of optically detectable marks (8) on the record carrier (4). By means of a verification beam (13), which trails the write beam (14) at a fixed distance, the recorded information is read immediately after recording. The write beam (13) and the verification beam (14) are produced by the same radiation source (10) whose intensity is modulated in conformity with the information to be recorded. In order to eliminate the effect of this modulation in the read signal (Vl) obtained by means of the verification beam (14) a dividing circuit (51) divides the read signal (Vl) by a signal (Vn) which is indicative of the instantaneous intensity of the radiation generated by the radiation source (10).

3 Claims, 4 Drawing Sheets

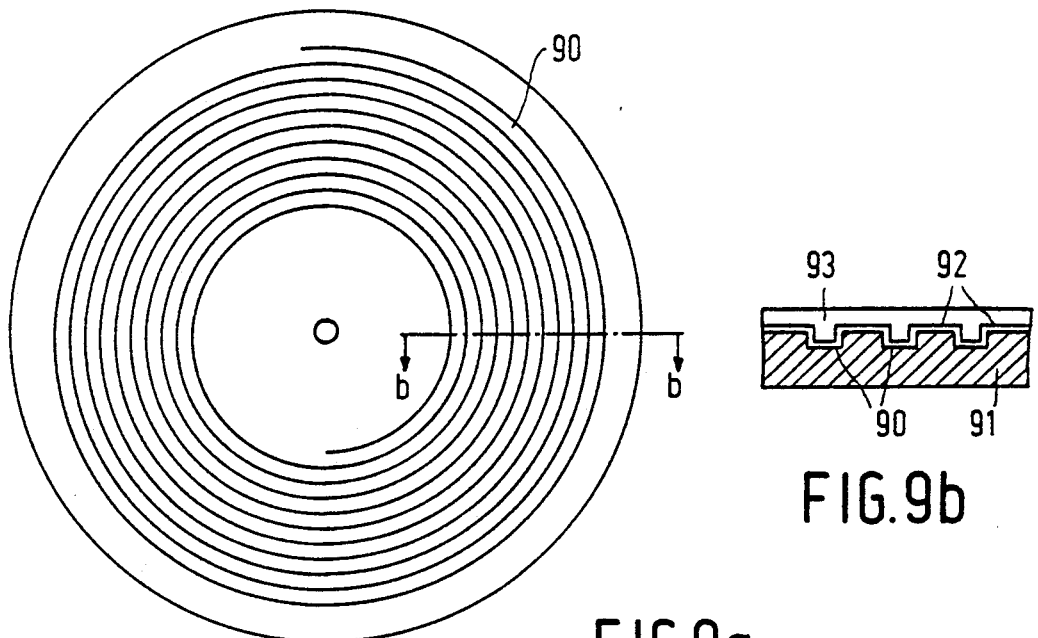
FIG. 9b
FIG. 9a
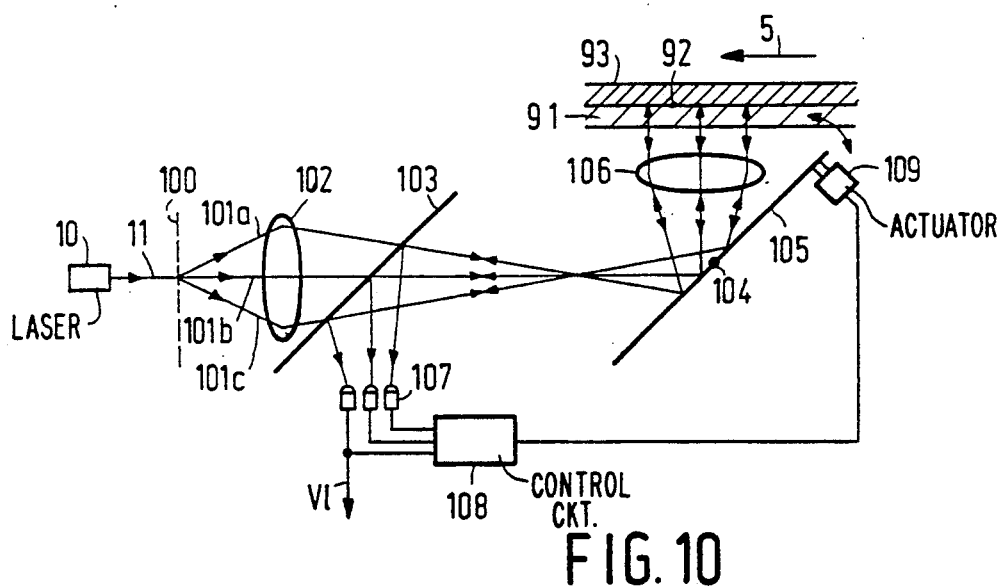
FIG. 10
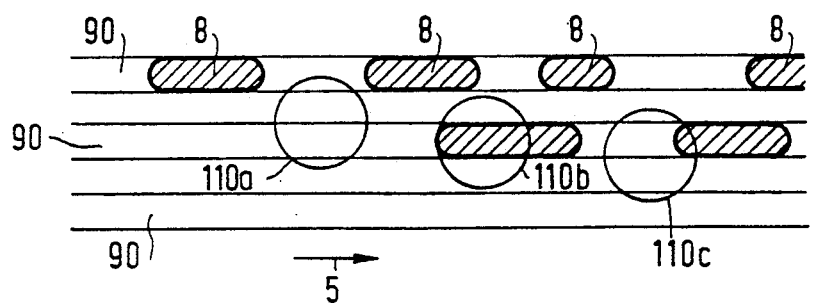
FIG. 11

READ-AFTER-WRITE OPTICAL RECORDING DEVICE HAVING A SINGLE RADIATION SOURCE AND EMPLOYING WRITE MODULATION OF SUCH SOURCE

BACKGROUND OF THE INVENTION

The invention relates to a device for recording information on a record carrier comprising a radiation sensitive recording layer, which device comprises means for directing a write beam of radiation produced by a radiation source to the recording layer, drive means for providing a relative movement between the write beam and the record carrier, a control circuit for controlling the intensity of the radiation produced by the radiation source in conformity with the information to be recorded so as to form an information pattern of optically detectable marks representing the information, means for directing a verification beam of lower intensity than the write beam to the recording layer in such a way that the verification beam trails the write beam and is modulated by the information pattern formed by means of said write beam, and detection means for converting the modulated verification beam into a corresponding read signal.

Such a device is disclosed in U.S. Pat. No. 4,448,277 (PHA 21.099). Reading the information immediately after recording has the advantage that in the case that the recording conditions are not optimal this can be detected almost immediately from the information being read. However, the prior art device has the drawback that the verification beam necessary for reading requires the use of an additional radiation source.

SUMMARY OF THE INVENTION

It is an object of the present invention to provide a recording device wherein recorded information can be read immediately after reading without the use of an additional radiation source. According to the principles of the invention, this is achieved by using the same radiation source for the radiation of the write beam and of the verification beam. The device includes a circuit for generating a correction signal which is an indication of the instantaneous intensity of the radiation produced by the radiation source, and a correction circuit for deriving from the correction signal and is read signal is a corrected read signal which is indicative of the read signal divided by the instantaneous intensity of the radiation produced by the radiation source.

The invention is based on the recognition of the fact that the influence of the disturbance produced in the read signal by the intensity modulation of the radiation source can be eliminated by dividing the read signal by the instantaneous intensity of the radiation produced by the radiation source, enabling the same radiation source as used for generating the modulated write beam to be used for generating the verification beam. The corrected read signal can be employed to verify whether recording proceeds correctly.

Preferably, the device comprises an analysis circuit for deriving from the corrected read signal an analysis signal which indicates the extent to which the information pattern scanned by the verification beam deviates from a specific optimum and an adaptation circuit for adapting the radiation source control depending upon the analysis signal.

The analysis circuit may comprise a comparator circuit which compares the information signal to be recorded with the corrected read signal. If the signal to be recorded is dc free the analysis circuit may be a duty cycle detection circuit or a second harmonic detector. Indeed in the case of a dc free signal the average duty cycle is 50% and there is no second harmonic signal component. Deviations in the duty cycle or the presence of second harmonic-components in the corrected read signal are therefore indicative of the extent to which the corrected read signal deviates from a dc free-signal.

The analysis signal can be derived in a reliable manner in an illustrative embodiment of the invention having an analysis circuit comprising a first comparator for comparing the corrected read signal with a first reference signal and an integrating circuit for deriving, by integration, the first reference signal from an output signal of the comparator, which output signal is indicative of the difference between the first reference signal and the corrected read signal, a circuit for deriving a second reference signal having a signal level situated substantially halfway between the minimum and the maximum signal value of the corrected read signal, a second comparator for comparing the first and the second reference signal and for generating as the analysis signal a signal which is indicative of the difference between the two reference signals.

Adaptation of the radiation source may be effected, for example, by adapting the duty cycle of the control signal of the radiation source. However, preferably the intensity of the modulated radiation is adapted because in particular the sensitivity of the radiation-sensitive information layers may exhibit substantial differences for different record carriers. Moreover, it is found that in practice the correctness of the recording depends greatly on the write intensity.

The radiation source control can be adapted throughout the recording process. In general the sensitivity of the radiation-sensitive recording layer is found to vary only slightly over the surface of one specific record carrier, so that in principle an adaptation at the beginning of the recording process is adequate, the control not being altered for remainder of the recording process.

Another illustrative embodiment of the recording device is characterized in that for deriving a tracking error signal which is indicative of the deviation between the centre of the landing spot of the write beam on the recording layer and the centre of the sevo track, the device comprises means for directing two satellite beams of radiation produced by the radiation source to the recording layer, one of the satellite beams preceding the write beam at a fixed distance and the other satellite beam following the write beam at a fixed distance in such a way that if the write beam is centred on the servo track each of the satellite beams is incident on one of the two edges of the servo track, the device employing the trailing satellite beam as the verification beam.

This embodiment benefits from the fact that in the case of a three-beam tracking system the trailing satellite beam is modulated in conformity with the recorded information pattern.

BRIEF DESCRIPTION OF THE DRAWINGS

Further embodiments and the advantages thereof will now become apparent upon reading hereinafter with reference to FIGS. 1 to 11, in which FIGS. 9a and 9b show a record carrier having a servo track, FIG. 10 shows diagrammatically a three-beam tracking system, and FIG. 11 shows the landing spots of the radiation beam of the three-beam tracking system on the record carrier.

DETAILED DESCRIPTION OF THE PREFERRED EMBODIMENTS

Figure 1:
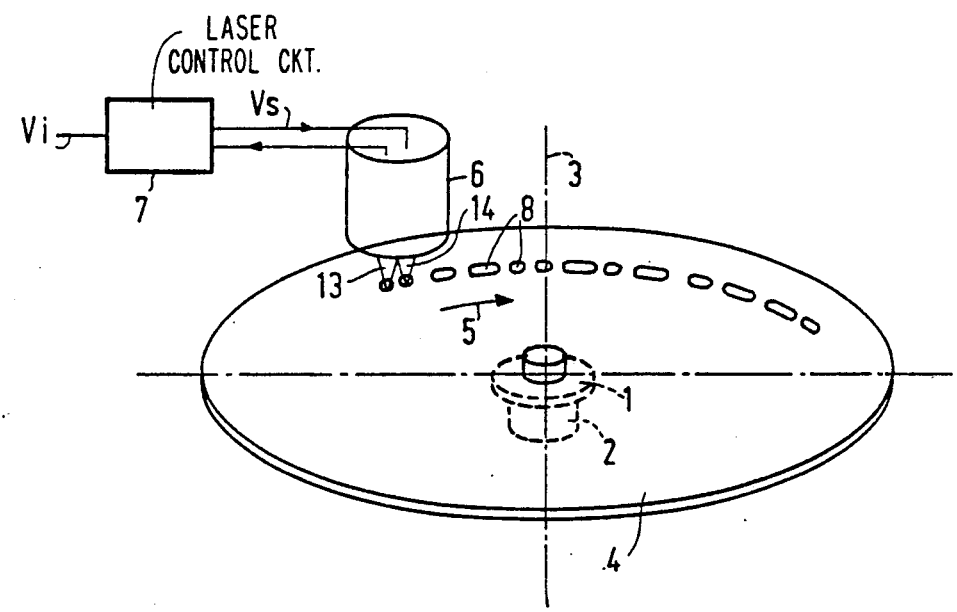
FIG. 1 shows diagrammatically an optical recording device.
Figure 2:
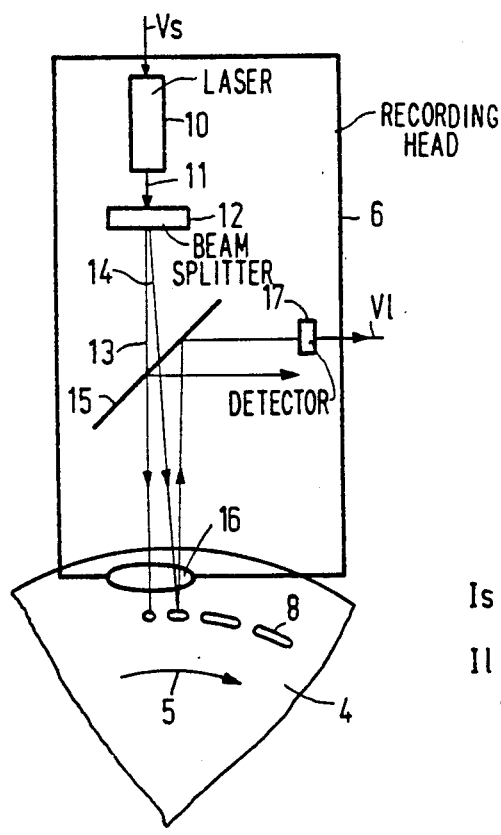
FIG. 2 shows in detail an optical recording head.

FIG. 1 shows diagrammatically an optical recording device, comprising a turntable 1 and a drive motor 2 for rotating a disc-shaped record carrier 4 about an axis of rotation in a direction indicated by an arrow 5. The record carrier 4 has a radiation sensitive recording layer which upon exposure to radiation of sufficiently high intensity is subjected to an optically detectable change, such as for example a change in reflectivity. Such a radiation-sensitive layer may comprise for example, a thin metal layer which upon exposure to a laser beam of comparatively high intensity can be removed locally. Alternatively, the recording layer may consist of a different material such as a radiation-sensitive dye or phase-change material whose structure can be changed from amorphous to crystalline or vice versa under the influence of radiation. An optical recording head 6 is arranged opposite the rotating record carrier. The optical recording head 6, which is shown in greater detail in FIG. 2 comprises a radiation source, for example a semiconductor laser 10, whose intensity can be controlled by means of a control signal Vs. The semiconductor laser 10 generates a laser beam 11, which by means of a beam splitter 12 is split into two subbeams each having an intensity proportional to the intensity Ib of the beam 11. One of the two beams is a write beam 13 of sufficiently high intensity to bring about the optically detectable change in the recording layer. The other beam is a verification beam 14 whose intensity is too low to bring about the optically detectable change. The beams 13 and 14 are directed towards the record carrier 4 via a semitransparent mirror 15 and a focus objective 16.

Figure 3:
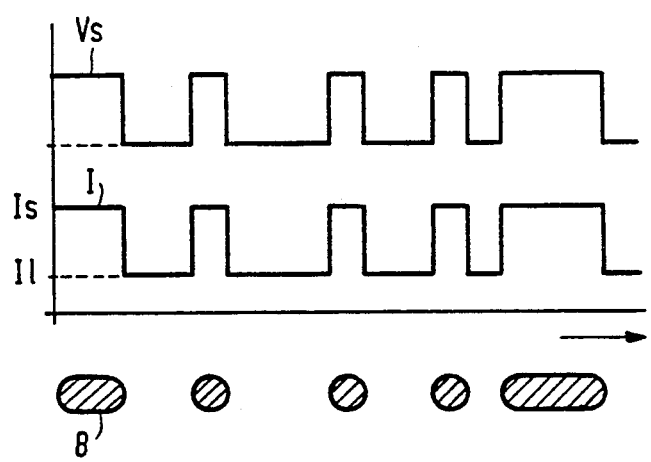
FIG. 3 shows a control signal for a semiconductor laser employed in the recording head, the corresponding intensity variation of the generated laser radiation, and the resulting information pattern.

In order to be recorded information signal Vi is converted by laser control circuit 7 into a control signal Vs for controlling in conformity with the information to be recorded the intensity I of the radiation generated by the semiconductor laser 10. The control signal Vs is shown in FIG. 3. The associated variation I of the write beam 13 is also given in FIG. 3. The intensity I of the write beam 13 varies between a value Is which is adequate to bring about optically detectable changes and a value Il which does not produce any detectable changes. When the recording layer is scanned with the write beam 13 whose intensity is thus modulated an information pattern of optically detectable marks 8 is formed in the recording layer. The verification beam 14 is directed in such a way that, viewed in the direction of movement indicated by the arrow 5, it is incident on the record carrier 4 at a short distance behind the write beam 13, so that the landing spot of the verification beam 14 follows substantially the same path as described by the landing spot of the write beam 13 on the record carrier 4. Upon reflection of the verification beam 14 this beam, which is already modulated in conformity with the control signal Vs, is subject to an additional modulation which depends on the information pattern of optically detectable marks 8 scanned by the verification beam. The verification beam 14 thus modulated is passed to a radiation-sensitive detector 17 by means of the focus objective 16 and the mirror 15. The radiation-sensitive detector 17 then produces a read signal V1 which is substantially proportional to the intensity of the amount of radiation received by the detector 17.

Figure 4:
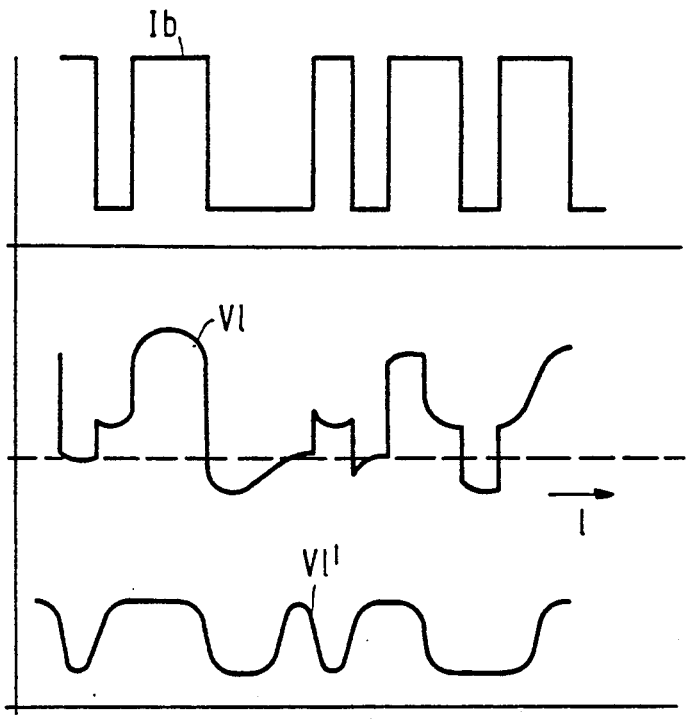
FIG. 4 shows the intensity variation of the generated radiation, the read signal and the corrected read signal.

FIG. 4 shows an example of the read signal V1 as a function of time. The variation in time of the signal V1 depends upon the intensity modulation of the radiation source 10 and the information pattern of optically detectable marks 8 being scanned by the verification beam 14. FIG. 4 also gives the intensity Ib of the radiation source as a function of time. The influence of the intensity modulation can be eliminated from the read signal V1 by dividing the signal V1 by the instantaneous value of the intensity of the radiation source. After elimination of the influence of the intensity modulation of the radiation source a corrected read signal V1' is obtained whose variation as a function of time is dictated exclusively by the information pattern being scanned. FIG. 4 also shows the corrected read signal V1'.

Figure 5:
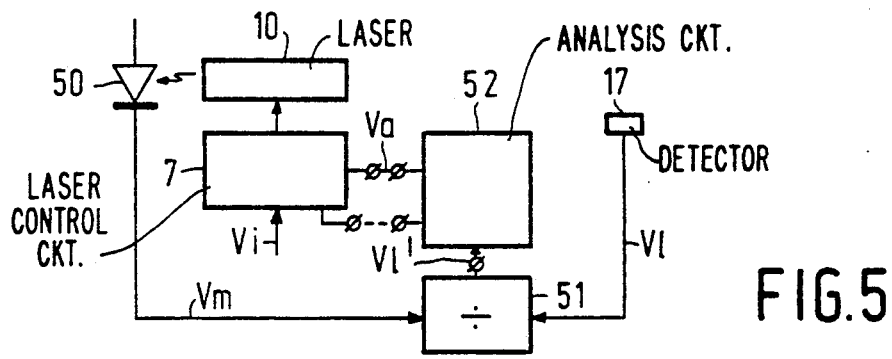
FIG. 5 shows a correction circuit employed in an embodiment of the recording device in accordance with the invention.

FIG. 5. shows a correction circuit for deriving the corrected signal V1'. By means of, for example, a radiation-sensitive diode 50 this circuit generates a signal Vm proportional to the intensity of the radiation produced by the semiconductor laser 10. The read signal V1 and the signal Vm are applied to a dividing circuit 51 of a customary type, which derives the corrected read signal V1' by dividing the read signal V1 by the signal Vm.

The corrected read signal V1', which is representative of the recorded information pattern is applied to an analysis circuit 52 which derives an analysis signal Va indicating the extent to which the information pattern scanned by the verification beam 14 deviates from a specific optimum. The analysis signal Va is applied to the laser control circuit 7 which under the influence of the analysis signal adapts the control of the semiconductor laser 10 so as to minimise the deviation represented by the analysis signal Va. The analysing circuit 52 may comprise, for example, a comparator to which the corrected read signal V1 and an information signal Vi are applied after the last mentioned signal has been delayed by a specific time corresponding to the distance between the write beam 13 and the verification beam 14. Such an analysis circuit is described in detail inter alia in U.S. Pat. No. 4,448,277, herewith incorporated by reference. If the information signal to be recorded is a dc free signal, for example a CD signal or a VLP signal, the signal obtained upon reading of the information pattern should also be a dc-free signal. The extent to which a signal deviates from a dc-free signal can be represented by the duty cycle or the second-harmonic signal component in the corrected read signal Vl'. Indeed, a dc-free signal has an average duty cycle of 50% and does not have a second harmonic signal component. A deviation of the average duty cycle from 50% or the presence of 2nd harmonic signal components can therefore be employed to adapt the semiconductor-laser control in such a way that the 2nd-harmonic component is reduced or the duty cycle more closely approximates to the 50% value. Analysis circuits employing duty cycle detectors or 2nd harmonic detectors are described in detail in U.S. Pat. No. 4,225,873, herewith incorporated by reference.

Figure 6:
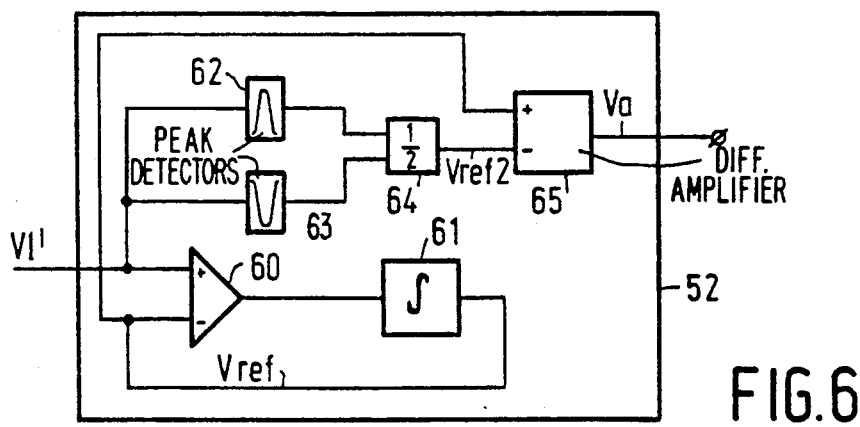
FIG. 6 shows an example of an analysis circuit, FIGS. 7a-7c by way of illustration give the variation of the corrected read signal for a plurality of different intensity settings of the radiation source.
Figure 7A:
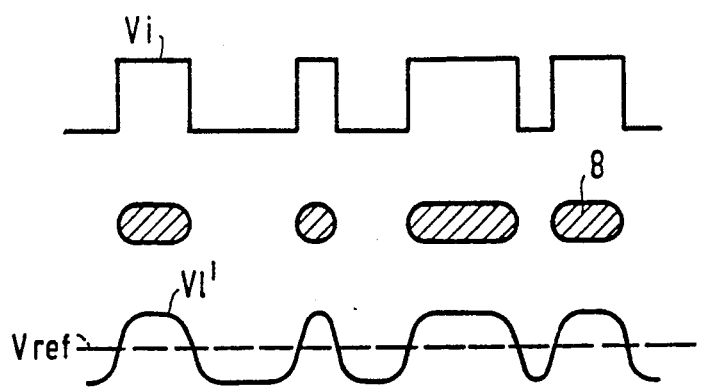

FIG. 6 shows another example of the analyses circuit 52, comprising a comparator 60 to which the corrected read signal Vl' and the reference signal Vref are applied to the non-inverting input and the inverting input respectively. The output signal of the comparator 60 is applied to an integrating circuit 61. In addition, the corrected read signal Vl' is applied to a positive-peak detector 62 and a negative-peak detector 63, which respectively detect the maximum and the minimum signal level in the corrected read signal Vl and apply this to an adder circuit 64 having a gain factor of $\frac{1}{2}$, so that the signal level on the output of the adder circuit 54 is situated halfway between the minimum and the maximum signal level of the corrected read signal Vl'. The signal on the output of the adder circuit 64 is applied to the inverting input of a differential amplifier 65 as a reference signal Vref2, and the reference signal Vref is applied from the output of the integrated circuit 61 to the non-inverting, input of the differential amplifier 65. An output signal of the first differential amplifier 65, which signal is indicative of the difference between the two input signals of the differential amplifier, functions as the analysis signal Va. The analysing circuit shown in FIG. 6 operates as follows. As a result of the feedback from the integration circuit 61 to the inverting input of the comparator 60 the reference signal Vref on the output of the integration circuit 61 will be set to a level for which the output signal Vo of the comparator 60 averages zero. If the corrected read signal Vl' is dc free, this means that the signal level of the reference signal is situated halfway between the maximum and the minimum signal level of the corrected read signal. If the corrected read signal Vl' is not dc-free, the signal level of the reference signal Vref will no longer be situated halfway between the maximum and the minimum of the corrected read signal. The extent to which the reference signal Vref deviates from the signal level indicated by the reference signal Vref2 thus represents the extent to which the corrected read signal deviates from a dc-free signal. By way of illustration FIG. 7a gives the information signal Vi, the associated information pattern of optically detectable marks 8, and the corrected read signal Vl' in the case that both the information signal and the corrected read signal Vl' are dc-free.

Figure 7B:
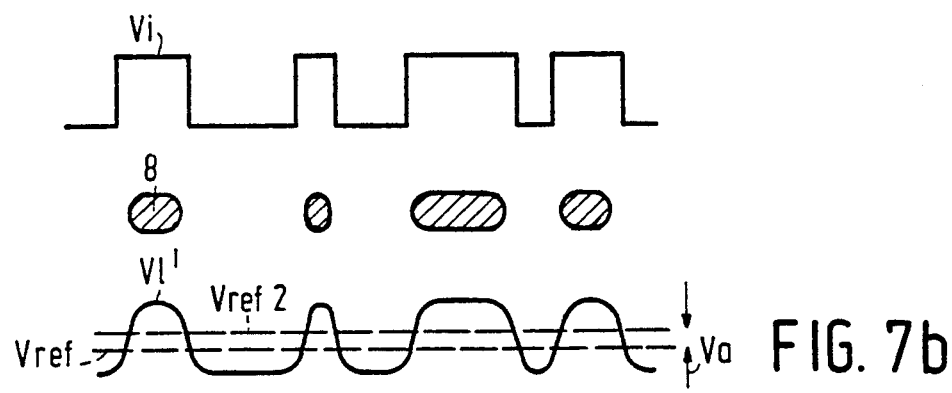
Figure 7C:
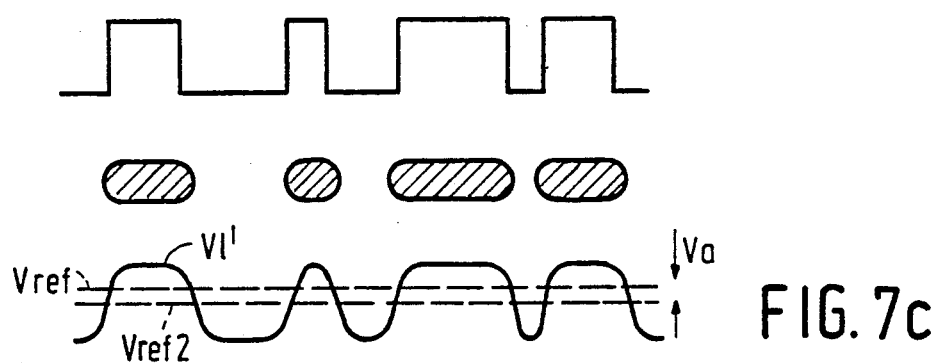

FIGS. 7b and 7c show the information signal Vi, the associated information pattern and the corrected read signal Vl' in the case that the semiconductor laser 10 is not controlled in an optimum manner, which results in non dc-free signals Vl'. For example, the optically detectable marks 8 in FIG. 7b are too short, so that the signal level of the reference signal Vref generated by the integration circuit 61 is comparatively low, while in FIG. 7c the marks are too long, so that the signal level of the reference signal Vref will be comparatively high. The analysis signal Va, which indicates the difference between the reference signal Vref2 and the reference signal Vref, can be used for adapting the control of the semiconductor laser 10. This is possible, for example, by adapting the duty cycle of the intensity modulation. In the case illustrated in FIG. 7b, in which the analysis signal indicates that the recorded optically detectable marks are too short, this can be effected by making the duty cycle of the intensity modulation larger than the duty cycle of the information signal Vi, while in the situation illustrated in FIG. 7c the duty cycle of the information signal. A circuit for adapting the duty cycle of the intensity modulation is described in detail inter alia in the aforementioned U.S. Pat. No. 4,488,277. However, preferably the intensity of the radiation is adapted instead of the duty cycle of the intensity modulation because the intensity of the radiation beam is a far more critical parameter in information recording. Moreover, the optimum write intensity varies considerably for different record carriers.

Figure 8:
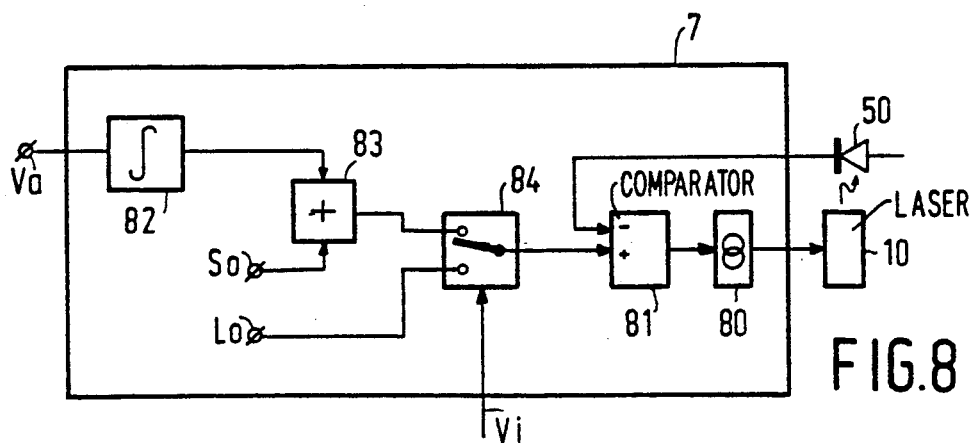
FIG. 8 shows an example of an adaptation circuit.

FIG. 8 shows an example of the control circuit 7 by means of which the intensity of the radiation produced by the semiconductor laser 10 is automatically optimised under the influence of the analysis signal Va. The control circuit 7 comprises an integrating circuit 82 to which the analysis signal Va is applied. An output signal of the integrating circuit 82 is applied to one of the two inputs of an adder circuit 83, a signal So being applied to the other input of the adder circuit. The signal So has a signal level corresponding to the nominal write intensity level Is of the write beam 13. An output signal of the adder circuit, which signal is indicative of the sum of the signals applied to the input, is applied to one of the two signal inputs of an electronically controllable switch 84. A signal Lo corresponding to the read intensity level Il of the write beam 13 is applied to the other signal input of the switch 84. The information signal Vi is applied to a control input of the switch 84. The switch 84 is of a customary type, which depending upon the logic signal level of the control signal Vi transfers one of the signals on its signal inputs to a signal output. The signal output of the switch 84, which consequently always indicates the desired intensity level of the write beam 13, is applied to a control circuit which sets the intensity of the semiconductor laser 10 to the level indicated by the output signal of the switch. This control circuit comprises a radiation-sensitive diode for measuring the intensity of the generated radiation, and a comparator circuit 81, which compares the intensity measured by the radiation-sensitive diode 50 with the desired intensity indicated by the output signal of the switch 84. Depending upon the result of the comparison the comparator circuit 81 controls a controllable current source 80 for generating a control current for the semiconductor laser 10, in such a way that the radiation intensity detected by the diode 50 is equal to the desired value as indicated by the output signal of the switch 84. The control circuit shown in FIG. 8 operates as follows. If the analysis signal Va indicates that the recorded marks 8 are too short or too long the voltage level on the output of the integrating circuit 82 is increased or reduced. As a result of this, the write intensity Is of the write beam 13 and hence the length of the recorded marks 8 will be adapted. Thus, the write intensity of the write beam 13 is adapted continually until the analysis signal Va has become zero and the intensity of the write beam is consequently optimal.

Information signals are often recorded on record carriers having a servo track intended for recording the information pattern. FIG. 9 shows such a record carrier, FIG. 9a being a plan view and FIG. 9b being a sectional view of a part of the record carrier, taken on the line b—b. The servo track bears the reference numeral 90. The servo track 90 may comprise, for example, a groove or a ridge formed in/on a transparent substrate 91 which is covered with a radiation-sensitive recording layer 92, which in its turn is coated with a protective layer 93. The servo track 90 enables the write beam 13 to be accurately directed on the servo track; in other words it enables the position of the write beam in a radial direction to be controlled by means of a tracking system employing the radiation reflected from the record carrier. A frequently used tracking system is the three-beam tracking system, which is described comprehensively in for example GB 1,434,834 (PHN 6296) and EP-A-0,210,603.

FIG. 10 shows diagrammatically an example of such a three-beam tracking system, in which the radiation beam 11 is aimed at a grating 100 to split the beam 11 into a high-intensity zero order beam 100b and two low intensity first-order beams 101a and 101c. The beams 101 are directed to the recording layer 92 via an optical system comprising an objective 102, a semitransparent mirror 103, a mirror 105 which is pivotable about an axis 104, and a focus objective 106. The beams 101a and 101c constitute a leading and a trailing satellite beam respectively, which are incident on the recording layer 92 before and behind the beam 101b, viewed in the direction of movement indicated by the arrow 5. The landing spots of the respective beams 101a, 101b and 101c on the recording layer 92 bear the reference numerals 110a, 110b and 110c respectively in FIG. 1. The beams are aimed in such a way that if the beam 101b is centred on the servo track 90 the landing spots 110a and 110c of the satellite beams 101a and 101b are each substantially indident on the edges of the servo track 90. The beams reflected from the recording layer 92 are then directed to a radiation-sensitive detection system 107 via the focus objective 106, the mirrors 105 and 103, said system comprising a plurality of radiation-sensitive diodes. The signal currents generated by the radiation-sensitive diodes are used for deriving in a customary manner a tracking-error signal, from which a control signal is derived for pivoting the mirror 105 by means of an actuator so as to minimise the tracking-error signal.

The invention is very suitable for use in conjunction with a three-beam tracking system. In that case the beam 101b can be used as the write beam, whose intensity can be modulated by modulating the intensity of the semiconductor laser. The trailing satellite beam 101c can be used as the verification beam. If the servo tracks 90 are so closely spaced that the landing spot 101c of the trailing satellite beam 101c partly overlaps the adjacent track it is preferred to direct the beams 101 in such a way that the landing spot 110c of the trailing beam 101c adjoins the servo track in which no optically detectable marks 8 have been recorded yet. This in order to preclude crosstalk from the adjacent track in the read signal V1.

I claim:

1. A device for recording information on a record carrier having a radiation sensitive recording layer, the device comprising:
    a radiation source for producing a beam of radiation;
    a control circuit for controlling the radiation source so that the intensity of the radiation beam produced thereby is modulated in conformity with the information to be recorded;
    beam-splitting means for deriving from the modulated radiation beam a write beam which is directed to the recording layer;
    drive means for producing relative movement between the write beam and the record carrier, so that the write beam forms an information pattern of optically detectable marks on the record carrier representing the information being recorded;
    said beam-splitting means being further adapted to derive from the modulated radiation beam a verification beam of lower intensity than the write beam and to direct the verification beam to the recording layer so as to trail the write beam, whereby the verification beam is modulated by the information pattern formed on the record carrier as well as by the intensity modulation of the radiation beam;
    radiation detection means for converting the modulated verification beam to a corresponding read signal;
    radiation sensitive circuit means responsive to the instantaneous intensity of the radiation beam produced by the radiation source to generate a correction signal which is indicative of such intensity;
    a correction circuit for deriving from said correction signal and said read signal a corrected read signal which corresponds to the read signal divided by the correction signal, whereby the corrected read signal is substantially free of modulation corresponding to the intensity modulation of the radiation beam and is modulated substantially solely in correspondence with the recorded information pattern;
    an analysis circuit coupled to said correction circuit for deriving from the corrected read signal an analysis signal which is indicative of the extent of deviation of the recorded information pattern from a predetermined optimum form of such pattern; and
    an adaptation circuit coupled to said analysis circuit and to said radiation source for controlling the radiation source so that the intensity of the radiation beam produced thereby varies in accordance with said analysis signal, whereby the recorded information pattern produced by the write beam will be in conformity with said optimum form of such pattern.

2. A device as claimed in claim 1, characterized in that the analysis circuit comprises: a first comparator for comparing the corrected read signal with a first reference signal and an integrating circuit for deriving, by integration, the first reference signal from an output signal of the comparator, which output signal is indicative of the difference between the first reference signal and the corrected read signal; a circuit for deriving a second reference signal having a signal level situated substantially halfway between a minimun and a maximum value of the corrected read signal; and a second comparator for comparing the first and the second reference signals and generating as the analysis signal a signal corresponding to the difference between the two reference signals.

3. A device according to claim 1 for recording information in a preformed servo track on the record carrier, characterized in that said verification beam constitutes one of two tracking beams of radiation, the second tracking beam also being derived by said beam-splitting means from the radiation beam produced by said radiation source and being directed to the recording layer so as to precede the write beam, the two tracking beams being spaced from the write beam at distances such that when the write beam is centered on the servo track each of the tracking beams is incident on one of the two edges of the servo track.

* * * * *